United States Patent [19]
Rossi

[11] Patent Number: 4,849,808
[45] Date of Patent: Jul. 18, 1989

[54] SYSTEM FOR FILTERING COLOR TELEVISION SIGNALS UTILIZING COMB FILTERING OF LUMINANCE WITH VARIABLE COMBING LEVEL AT LOW FREQUENCIES AND FILTERING OF CHROMINANCE BY COMB FILTERING TIME MULTIPLEXED COLOR DIFFERENCE SIGNALS

[76] Inventor: John P. Rossi, 45 Arrow Head Dr., Stamford, Conn. 06903

[21] Appl. No.: 183,929

[22] Filed: Apr. 20, 1988

[51] Int. Cl.$^4$ .................... H04N 5/40; H04N 9/65
[52] U.S. Cl. ............................ 358/31; 358/23; 358/35
[58] Field of Search ............ 358/31, 23, 30, 35, 358/39, 40, 41

[56] References Cited

U.S. PATENT DOCUMENTS

| | | | |
|---|---|---|---|
| 4,050,084 | 9/1977 | Rossi | 358/31 |
| 4,731,660 | 3/1988 | Faroudja et al. | 358/31 |
| 4,750,033 | 6/1988 | Fukuda et al. | 358/31 |

FOREIGN PATENT DOCUMENTS 276986 12/1987 Japan .
63295 3/1988 Japan .

OTHER PUBLICATIONS

"Some Thoughts on Using Filters in the Broadcast Television Transmitter and at the Receiver", Rudolf Turner, *IEEE Trans. on Consumer Electronics,* vol. CE-23, No. 3, Aug. 1977, pp. 248–257.
Y. Faroudja and J. Roizen, "Improving NTSC to Achieve Near-RGB Performance" SMPTE Journal, Aug. 1987, vol. 6, No. 8, pp. 750–761.
J. P. Rossi, "Optimizing The Encoding Process to Overcome the Major Defects of NTSC Color Pictures," presented at 129th SMPTE Technical Conf., Oct. 31–Nov. 4, 1987, SMPTE Preprint No. 129-92, pp. 1–15.

*Primary Examiner*—James J. Groody
*Assistant Examiner*—Robert M. Bauer
*Attorney, Agent, or Firm*—Spencer E. Olson

[57] ABSTRACT

In the generation of NTSC color television signals, the luminance signal and the color difference signals are pre-filtered along the vertical picture axis. Full bandwidth luminance is pre-filtered by combining, with appropriate coefficients, signals from three adjacent television lines, and, additionally, a vertical detail signal is generated by combining the same three adjacent television lines, with difference coefficients, and low pass filtering the resultant signal. A desired adjustable level of the vertical detail signal is added back into the pre-filtered full bandwidth luminance signal to partially or fully cancel the effect at the lower frequencies of pre-filtering the luminance signal. Time multiplexed color difference signals at baseband are prefiltered by combining with appropriate coefficients, the signals from three adjacent television lines. The prefiltering operation is translated to the conventional NTSC chrominance band by the color modulation process. The processed chrominance signal is added to the processed luminance signal to obtain an NTSC color television signal.

12 Claims, 2 Drawing Sheets

SYSTEM FOR FILTERING COLOR TELEVISION SIGNALS UTILIZING COMB FILTERING OF LUMINANCE WITH VARIABLE COMBING LEVEL AT LOW FREQUENCIES AND FILTERING OF CHROMINANCE BY COMB FILTERING TIME MULTIPLEXED COLOR DIFFERENCE SIGNALS

BACKGROUND OF THE INVENTION

This invention relates generally to the NTSC color television system which carries picture information by means of luminance and chrominance signals, and more particularly to a system for pre-filtering the luminance and chrominance signals prior to encoding of the NTSC color television signal.

It is well known that the NTSC color encoded signal consists of a luminance signal and a chrominance signal, the latter, in turn, consisting of two color difference signals modulating, in quadrature, the NTSC color subcarrier. The chrominance signal shares with the luminance signal the frequency band from approximately 2.1 MHz to 4.2 MHz. It is also known that, in general, the spectral energy of the luminance signal is concentrated at harmonics of the television horizontal scan line frequency, whereas the chrominance spectral energy is concentrated at odd harmonics of one-half the horizontal scan line frequency. This implies that, in general, within the spectral band occupied by both luminance and chrominance, the luminance signal energy and the chrominance signal energy are spectrally interleaved. This spectral interleaving permits the use in a color decoder of filters of the interleaving type, called comb filters, to nearly completely separate the luminance and the chrominance signals. However, because spectral interleaving of the luminance and chrominance does not occur at sharp luminance or chrominance transitions along or in the direction of the vertical picture axis, there is a certain amount of luminance/chrominance crosstalk which results in the luminance being mistakenly decoded as color signals and/or the chrominance being displayed as a luminance signal. It has been known for a decade or more that the crosstalk problem can be reduced by pre-filtering the luminance present within the frequency band shared with the chrominance, and also prefiltering the chrominance, prior to encoding the signals into an NTSC color signal. Such pre-filtering serves to reduce or eliminate those vertical signal transitions that cause the luminance to spread into the chrominance spectral gaps, and vice versa, and has heretofore been achieved by comb filtering or anti-alias filtering. Pre-comb filtering of both the chrominance signal and the luminance signal present within the spectral frequency band of the chrominance not only reduces cross-luminance and cross-color defects, but also reduces interline flicker of high frequency details, a known defect of interlaced television systems.

Such known pre-comb filtering systems are not without defects, however, in that combing of the chrominance signal within the chrominance band may introduce errors that are extremely difficult to avoid. For example, the chrominance signal normally is bandpass filtered prior to comb filtering; however, the bandpass filter must have a perfectly linear phase response characteristic if there is to be perfect combing, which, is very difficult to obtain and maintain. Further, because the chrominance signal is on a subcarrier and has a partial vestigial sideband, phase relationships and distortions at the upper or lower chrominance sidebands results in a less than perfect combing of that chrominance signal. Accordingly it would be desirable to be able to comb filter the chrominance signal without incurring distortions and errors due to the modulation and bandpass filtering processes.

Another problem inherent in interlaced scanning systems known as low frequency interline flicker is often caused by the signal attempting to convey excessive vertical resolution, and cannot be alleviated by comb filtering the chrominance and the higher frequency luminance signals. The low frequency interline flicker is a visual indication that the Nyquist limit is being violated along the vertical picture axis. Although an interlaced system is quite forgiving of such violation, so long as they are not excessive, some signal sources generate very high vertical spatial frequencies which, in an interlaced system, will cause highly visible low frequency interline flicker. This is particularly true of computer generated signals and certain signals from charge coupled pick-up devices (CCD). Therefore, there is a need for apparatus to, at times, pre-filter the luminance signal along the vertical scan axis at frequencies residing in the spectral frequency band below the chrominance spectral frequency band.

One object of the present invention is to provide an improved system for comb filtering the chrominance signal which circumvents the problems associated with comb filtering a signal that is modulated on a subcarrier and has undergone bandpass filtering.

Another object of the present invention is to provide a system for pre-filtering a luminance signal along the vertical picture axis so as to reduce the visibility of low frequency interline flicker, and which also provides conventional higher frequency luminance comb filtering.

SUMMARY OF THE INVENTION

Briefly, the system according to the invention includes a comb filter for combining three time sequential television lines labeled "Top" (T), "Middle" (M) and "Bottom" (B) to generate a full bandwidth combed luminance signal, $Y_{comb} = M + \frac{1}{2}(T+B)$ and a full bandwidth vertical detail signal, $V = M - \frac{1}{2}(T+B)$. The vertical detail signal is lowpass filtered by a filter having an upper cutoff frequency approximately equal to the lowest frequency of the lower sidebands of the chrominance signal, that is, approximately 2.1 MHz. An adjustable amount of the resulting low frequency vertical details signal, where the amount is less than or equal to one, is added to the $Y_{comb}$ signal so as to partially or fully cancel the comb-filter characteristics of the signal, $Y_{comb}$, within the luminance band of vertical details and produce a modified combed luminance signal, $Y'_{comb}$.

According to another aspect of the invention, two color difference signals, I/Q (or R−Y, B−Y) having appropriate basebandwidths and time multiplexed on a sample-by-sample basis are suitably delayed so as to provide three sequential television lines respectively labeled "Top color" ($T_c$) "Middle color" ($M_c$) and "Bottom color" ($B_c$). These line signals are suitably combined to generate a combed, time multiplexed, color difference signal, $CD_{comb} = M_c + \frac{1}{2}(T_c + B_c)$, which is then used to modulate the NTSC color subcarrier so as to obtain a combed chrominance signal, $C_{comb}$. This combed signal is combined with the modified combed luminance signal, Y', generated in the manner described in the preceding paragraph to produce an NTSC color television signal.

The features of the invention considered to be novel are set forth in particular in the appended claims. The invention itself, however, both as to its construction and its method of operation, together with additional objects, features and advantages thereof, will be best understood from the following description of a presently preferred embodiment when read in conjunction with the accompanying drawings.

DESCRIPTION OF THE PREFERRED EMBODIMENT

Figure 1:
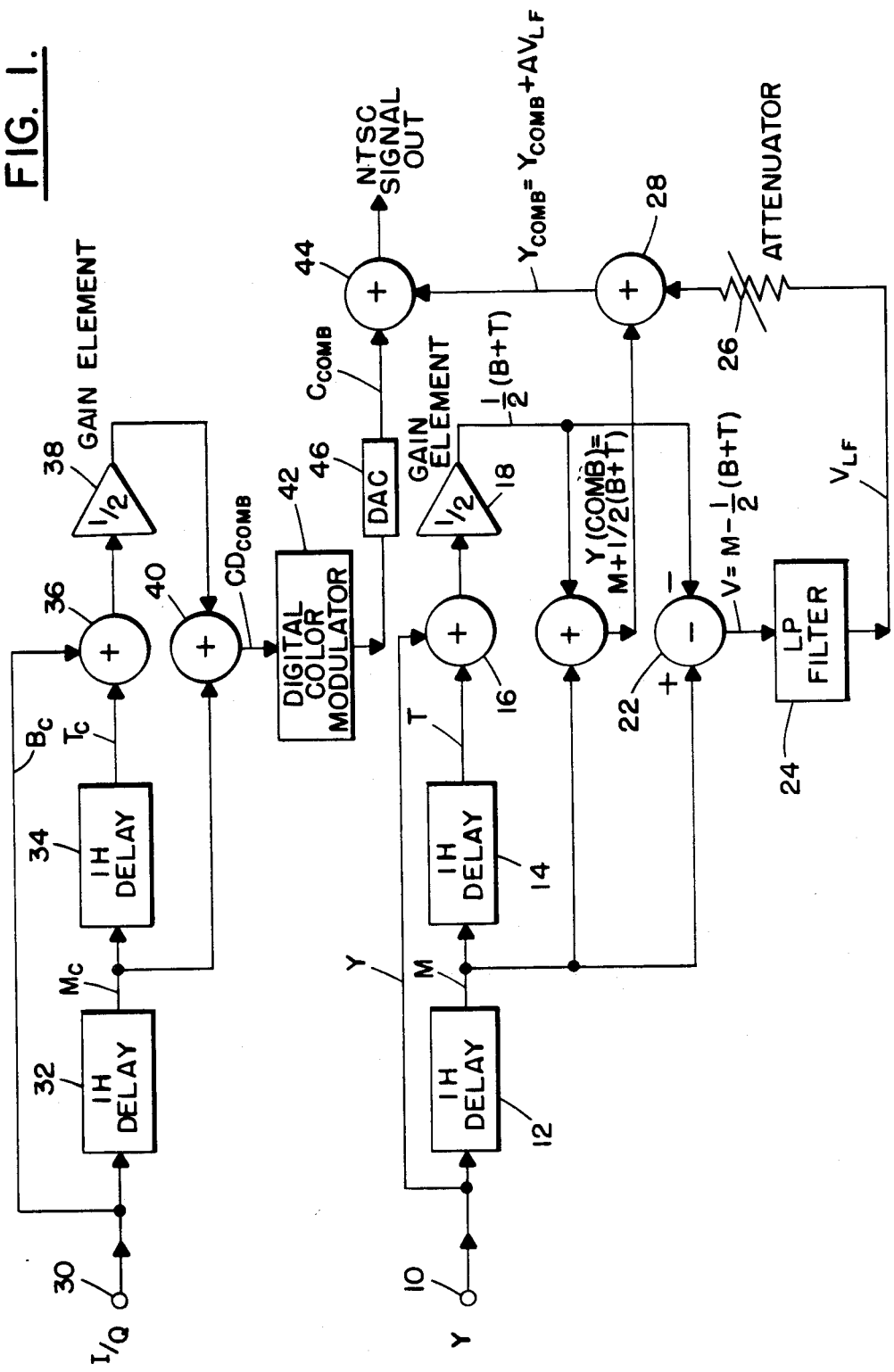
FIG. 1 is a block diagram of a system according to the invention for anti-alias filtering of the luminance and chrominance components of NTSC color television signals.

The filtering system according to the invention, schematically illustrated in FIG. 1, is intended for use in the NTSC color television system in which the picture information is carried by means of a luminance signal, Y, generated by linear matrixing of gamma corrected color signals, and two lower bandwidth color difference signals, I/Q (or R−Y, B−Y). In FIG. 1, a conventional full bandwidth luminance signal, Y, applied to an input terminal 10 from an external source (not shown) is applied to a delay element 12 having a delay equal to the period of one horizontal television scan line, 63.5 microseconds in the NTSC color system. The delayed signal appearing at the output of delay element 12 is applied to another delay element 14, also having a delay equal to the period of one television scan line. The described time delays cause three adjacent line components of the luminance signal to be aligned with respect to time: the once-delayed component of the signal appearing at the output of delay element 12 is labeled the "Middle" (M) component; the twice-delayed component of the signal appearing at the output of delay element 14 is labeled the "Top" (T) component, and the undelayed signal Y is labeled the "Bottom" (B) component. The B component is added to the T component in an adder 16 and the resulting sum signal is attenuated in amplitude by a factor of two by a suitable gain element 18 to obtain the signal $\frac{1}{2}(B+T)$. This signal is added, in an adder 20, to the M component appearing at the output of delay element 12 so as to produce at the output of the adder 20 the signal, $Y_{comb}=M+\frac{1}{2}(B+T)$, that is, the luminance signal which has undergone comb filtering over its full frequency band.

The component M appearing at the output of delay element 12 is also applied to the addend input of a subtractor element 22 to the subtrahend input of which the signal $\frac{1}{2}(B+T)$ is applied. The signal produced at the output of subtractor 22, $V=M-\frac{1}{2}(B+T)$, is a wideband vertical detail signal. This signal is applied to the input of a low pass filter 24 having a cutoff frequency approximately equal to the lowest frequency of the lower sidebands of the chrominance signal, that is to say, approximately 2.1 MHz; the exact frequency is not critical and other cutoff frequencies within reason could be used. The low frequency vertical detail signal, $V_{lf}$, produced at the output of filter 24 is attenuated by a desired factor A by a suitable attenuator 26, the factor A being equal to or less than unity, so as to produce an attenuated low frequency vertical detail signal, $AV_{lf}$. This signal is added in an adder 28 to the full bandwidth combed luminance signal $Y_{comb}$ produced at the output of adder 20 and produces at its output a modified combed luminance signal, $Y'_{comb}$, which exhibits full combed characteristics in the frequency spectrum above approximately 2.1 MHz (or other selected cutoff frequency for filter 24), and has partial or zero comb filtering characteristics in the frequency band of $B_{lf}$. Thus, it is seen that the luminance signal is pre-filtered along the vertical picture axis so as to reduce the visibility of lower frequency interline flicker and that this function is combined with that of providing conventional comb filtering of the higher frequency luminance.

A system for filtering the chrominance signal which circumvents problems experienced with previously known techniques for comb filtering chrominance, schematically illustrated in the upper portion of FIG. 1, receives color difference signals (I/Q) at an input terminal 30. Preferably, the signals are time multiplexed so as to consist of time alternating samples of the two color difference signals used to generate the NTSC color television signal. It will be understood that the color difference signals, furnished from an external source (not shown) in a time multiplexed fashion, have been properly lowpass filtered to their appropriate bandwidths, and each sampled with a sampling frequency that is higher than twice the highest frequency of either color difference signal. The time multiplexing is on a sample-by-sample basis, where a pair of samples, one from each color difference signal, occupies a period which is no longer than one-half the period of the highest video frequency of either color difference signal. For example, for use in the NTSC system, the sampling frequency for the color difference signal may be 14.3 MHz and each pair of time multiplexed color difference samples occur at a frequency of 7.15 MHz.

The input I/Q signal is applied to a digital delay element 32 of known construction having a delay equal to the period of one television scan line (63.5 microseconds), and the delayed signal produced at its output is applied to another delay element 34 having exactly the same delay as delay element 32. The once-delayed output of delay element 32 is called the "Middle color" ($M_c$) component, the twice-delayed signal at the output of delay element 34 is labeled the "Top color" ($T_c$) component, and the undelayed input signal I/Q is called the "Bottom color" ($B_c$) component. The $B_c$ and $T_c$ components are added together in an adder 36, the amplitude of the output of which is attenuated by a factor of two in a suitable gain element 38. The output of gain element 38 is added, in an adder 40, to the $M_c$ component appearing at the output of delay element 32 so as to produce at its output a comb filtered time multiplexed color difference signal, $CD_{comb}$, which is then used as the color sub-carrier modulating signal in a suitable color modulator circuit 42 of known construction to directly map the combed characteristics of the color difference signals to the chrominance band.

Figure 2:
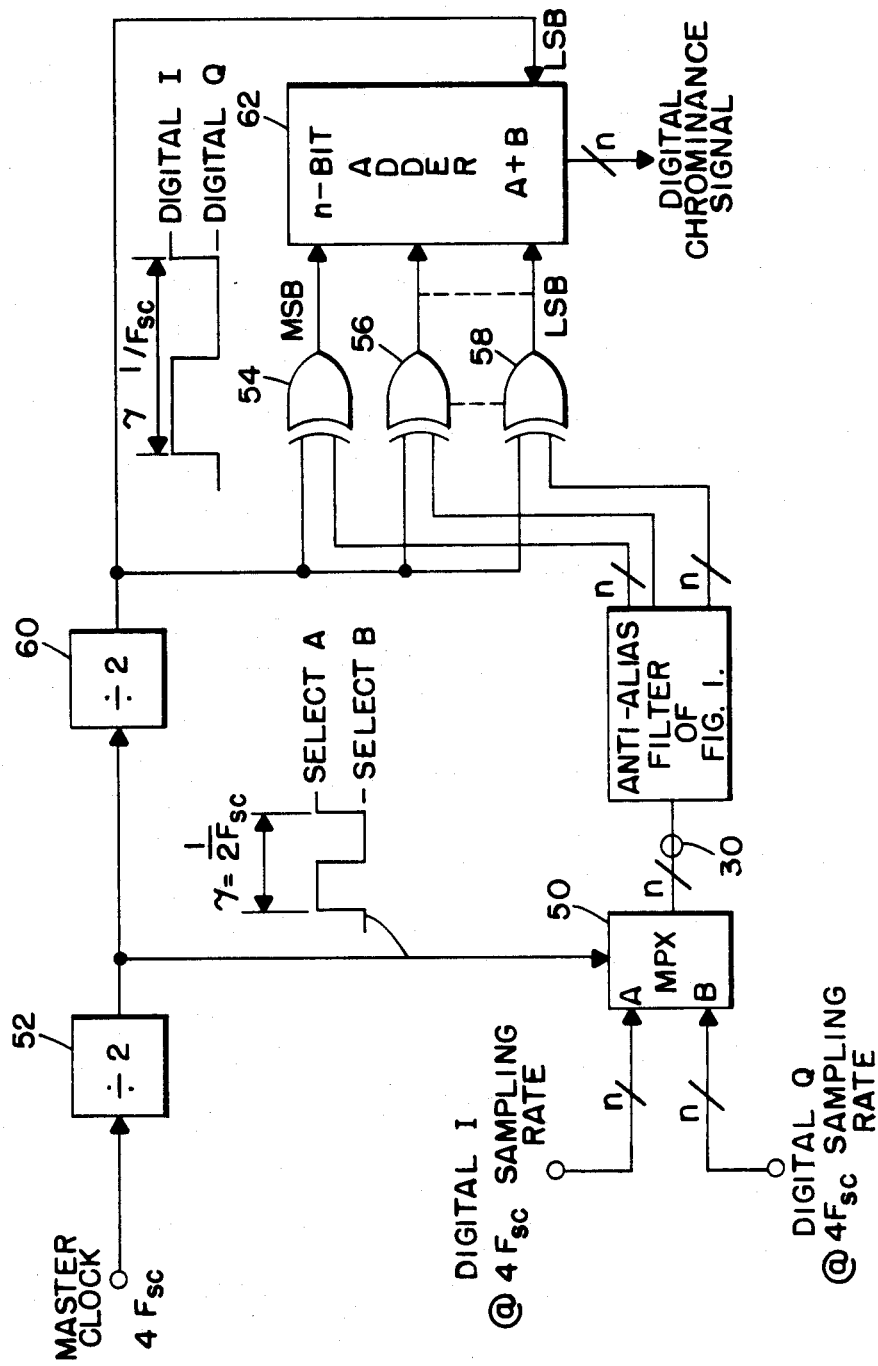
FIG. 2 is a block diagram of a digital color modulator forming part of the system of FIG. 1.

An example of a digital color modulator suitable for use with the just-described color difference anti-alias filter is schematically illustrated in FIG. 2. Digital color difference signals I and Q, each sampled at a frequency $4F_{sc}$, where $F_{sc}$ is the color sub-carrier frequency in the NTSC color television system, are time multiplexed in a multiplexer 50 controlled by select pulses having a frequency of $2F_{sc}$, obtained by dividing the frequency of a masterclock signal by two in a divider 52. The digital samples of the color signal I are selected during the positive half-cycle of the select signal and the digital Q samples are selected during the negative half cycle, and the resulting n-bit time multiplexed color difference signals I/Q are applied to the input terminal 30 of the chrominance anti-alias filter of FIG. 1. The baseband n-bit time multiplexed filtered color difference signal produced at the output of the anti-alias filter is applied to a bank of n Exclusive OR gates 54, 56, 58 and n, where n is equal to the number of binary bits to which the color difference signal is quantized.

The other input to each of the Exclusive OR gates is a square wave having a frequency $F_{sc}$, obtained by dividing the output of divider 52 by two in a second divider 60; thus it has a period equal to that of the color subcarrier. Therefore, this color subcarrier square wave has a binary value of "1" for half the color subcarrier period and a binary value of "0" for the other half. When the square wave $F_{sc}$ is a digital "1", the Exclusive OR gates cause the n-bit time multiplexed color difference signal to be inverted (that is to say, any bit that is "1" becomes "0" and any bit that is "0" becomes "1"). Also, when $F_{sc}$ has a value of "1" an n-bit adder 62 adds a +1 to the inverted signal, causing the inverted color difference signal to be in the 2's complement form, which is normally required in digital arithmetic for an inverted signal. When the square wave $F_{sc}$ is a digital "0", the n-bit time multiplexed color difference signal goes through the bank of Exclusive OR gates and the adder completely unchanged. The signal produced at output of adder 62 is the modulated color signal in digital form. The combed chrominance signal, $C_{comb}$, appearing at the output of adder 62 (which corresponds to the output of digital color modulator 42 in FIG. 1) is added, in a suitable adder 44, to the modified combed luminance signal, $Y'_{comb}$ signal, to obtain a NTSC color signal. If the modified combed luminance signal, $Y'_{comb}$, is developed with analog circuit components, which are readily available at lower cost than digital components, the digital combed chrominance signal would be converted to analog form by a suitable digital-to-analog converter 46 before being added to the analog $Y'_{comb}$ signal. On the other hand, should it be desired to obtain the modified combed luminance signal by digital means, the resulting digital $Y'_{comb}$ signal would be added in a suitable digital adder 44 to the digital combed chrominance signal from digital color modulator 42 and the D/A converter 46 could be dispensed with.

Without further analysis, the foregoing will so fully reveal the gist of the present invention that others can by applying current knowledge readily adapt it for various applications using circuitry which may utilize different component parts while achieving a result equivalent to that of the described preferred embodiment. Such adaptations are intended to be included within the meaning and range of equivalence of the appended claims.

I claim:

1. For use in the NTSC color television system wherein the picture information is carried by a luminance signal and a chrominance signal comprising two color difference signals, a system for comb filtering said luminance and chrominance signals prior to NTSC color encoding, said system comprising, in combination:

first generating means for generating simultaneous full bandwidth luminance signals for three adjacent television lines identified as Top (T), Middle (M) and Bottom (B) line components, respectively, first combining means for combining said T, M and B line components for generating a combed full bandwidth luminance signal, $Y_{comb}=M+\frac{1}{2}(T+B)$ and a full bandwidth vertical detail signal, $V=M-\frac{1}{2}(T+B)$ low pass filter means for filtering said full bandwidth vertical detail signal for producing a lower frequency vertical detail signal, $V_{lf}$, first adding means for adding said signal $Y_{comb}$ to a desired fraction of the amplitude of said signal $V_{lf}$ for producing a modified combed luminance signal, $Y'_{comb}$, which exhibits full combing characteristics at frequencies beyond the frequency band of signal $V_{lf}$ and partial or no comb filtering characteristics within the frequency band of signal $V_{lf}$, second generating means for generating time multiplexed color difference signals for three time sequential lines identified as Top color ($T_c$), Middle color ($M_c$) and Bottom color ($B_c$) signal components, respectively, second combining means for combining said $T_c$, $M_c$ and $B_c$ signal components for generating a baseband time multiplexed combed color difference signal, $CD_{comb}=M_c+\frac{1}{2}(T_c+B_c)$, modulator means for modulating a color subcarrier with said combed color difference signal for generating a combed chrominance signal $C_{comb}$, and second adding means for adding said modified combed luminance signal $Y'_{comb}$ to said combed chrominance signal $C_{comb}$ for producing an NTSC color television signal.

2. Apparatus according to claim 1, wherein said first generating means comprises first and second serially connected delay elements each having a delay equal to the period of one horizontal television line, and means for applying as an input signal to said first delay element a full bandwidth luminance signal; and wherein said first combining means comprises a first adding element having first and second input terminals respectively connected to the input of said first delay element and to the output of said second delay element for combining said input signal with a twice-delayed version of said input signal for generating a (T+B) component, means including a second adding element for adding the once-delayed version of said input signal produced at the output of said first delay element to said (T+B) component attenuated by a factor of two for generating said combed full bandwidth luminance signal $Y_{comb'}$, and a subtracting element for subtracting said (T+B) component attenuated by a factor of two from the once-delayed version of said input signal produced at the output of said first delay element for generating said full bandwidth vertical delay signal V.

3. Apparatus according to claim 2, wherein said second generating means comprises third and fourth serially connected delay elements each having a delay equal to the period of one horizontal television line, and means for applying as an input signal to said third delay element time multiplexed color difference signals; and wherein said second combining means comprises a fourth adding element having first and second input terminals respectively connectd to the input of said third delay element and to the output of said fourth delay element for combining said input signal with the twice-delayed version of said input signal produced at the output of said fourth delay element for generating a ($T_c+B_c$) component, means including a fifth adding element for adding the once-delayed version of said input signal produced at the output of said third delay element to said ($T_c+B_c$) component attenuated by a factor of two for producing said baseband time multiplexed combed color difference signal, and means for applying said baseband time multiplexed combed color difference signal to said modulator means.

4. Apparatus according to claim 3, wherein said low pass filter has a passband of about 2.1 MHz.

5. Apparatus according to claim 2, wherein said low pass filter has a passband of about 2.1 MHz.

6. Apparatus according to claim 1, wherein said low pass filter has a passband of about 2.1 MHz.

7. For use in the NTSC color television system wherein the picture information is carried by a luminance signal and a chrominance signal comprising two color difference signals, a system for anti-alias filtering said luminance signal prior to NTSC color encoding, said system comprising, in combination:

first generating means for generating simultaneous full bandwidth luminance signals for three adjacent television lines identified as Top (T), Middle (M) and Bottom (B) line components, respectively, first combining means for combining said T, M and B line components for generating a combed full bandwidth luminance signal, $Y_{comb}=M+\frac{1}{2}(T+B)$, and a full bandwidth vertical detail signal, $V=M-\frac{1}{2}(T+B)$, low pass filter means for filtering said full bandwidth vertical detail signal and producing a lower frequency vertical detail signal, $V_{lf}$, and first adding means for adding said signal $Y_{comb}$ to an adjustable amplitude fraction of said signal $V_{lf}$ for generating a modified combed luminance signal $Y'_{comb}$ which exhibits full combing characteristics at frequencies above the frequency band of said signal $V_{lf}$ and partial or no comb filtering characteristics within the frequency band of said signal $V_{lf}$.

8. Apparatus according to claim 7, wherein said first generating means comprises first and second serially connected delay elements each having a delay equal to the period of one horizontal television line, and means for applying as an input signal to said first delay element a full bandwidth luminance signal; and wherein said first combining means comprises a first adding element having first and second input terminals respectively connected to the input of said first delay element and to the output of said second delay element for combining said input signal with a twice-delayed version of said input signal for generating a (T+B) component, means including a second adding element for adding the once-delayed version of said input signal produced at the output of said first delay element to said (T+B) component attenuated by a factor of two for generating said combed full bandwidth luminance signal $Y_{comb}$, and a subtracting element for subtracting said (T+B) component attenuated by a factor of two from the once-delayed version of said input signal produced at the output of said first delay element for generating said full bandwidth vertical detail signal V.

9. For use in the NTSC color television system wherein the picture informatin is carried by a luminance signal and a chrominance signal consisting of two color difference signals, the combination of the system defined by claim 7 or claim 8 with a system for comb filtering said chrominance signal prior to NTSC color encoding, said chrominance signal filtering system comprising:

second generating means for generating time multiplexed color difference signals for three time sequential lines identified as Top color ($T_c$), Middle color ($M_c$) and Bottom color ($B_c$) signal components, respectively, second combining means for combining said $T_c$, $M_c$ and $B_c$ signal components for generating a baseband time multiplexed combed color difference signal, $CD_{comb}=M_c+\frac{1}{2}(T_c+B_c)$, modulator means for modulating a color subcarrier with said combed color difference signal for generating a combed chrominance signal $C_{comb}$, and second adding means for adding said modified combed luminance signal $Y'_{comb}$ to said combed chrominance signal $C_{comb}$ for producing an NTSC color television signal.

10. The system defined by claim 9, wherein said second generating means comprises third and fourth serially connected delay elements each having a delay equal to the period of one horizontal television line, and means for applying as an input signal to said third delay element time multiplexed color difference signals; and wherein said second combining means comprises a fourth adding element having first and second input terminals respectively connected to the input of said third delay element and to the output of said fourth delay element for combining said input signal with the twice-delayed version of said input signal produced at the output of said fourth delay element for generating said ($T_c+T_b$) component, means including a fifth adding element for adding the once-delayed version of said input signal produced at the output of said third delay element to said ($T_c+B_c$) component attenuated by a factor of two for producing said baseband time multiplexed combed color difference signal, $CD_{comb'}$ and means for applying said baseband time multiplexed combed color difference signal, $CD_{comb'}$ to said modulator means.

11. For the generation of NTSC color television signals, a system for pre-filtering the luminance signal and the color difference signal along the vertical picture axis, said system comprising, in combination:

first combining means for combining, with a first set of appropriate coefficients, full bandwidth luminance signals from three adjacent television lines for pre-filtering said full bandwidth luminance signal, second combining means for combining the same three adjacent television lines, with a second different set of coefficients, and generating a full bandwidth vertical detail signal, low pass filter means for filtering said full bandwidth vertical detail signal for producing a lower frequency vertical detail signal, $V_{lf}$, means including first adding means for adding a desired adjustable level of said lower frequency vertical detail signal back into said pre-filtered full bandwidth luminance signal for partially or fully cancelling the effect at the lower frequencies of prefiltering the luminance signal, means for pre-filtering said chrominance signal including third combining means for combining time multiplexed color difference signals at baseband, with appropriate coefficients, from the aforesaid three adjacent television lines, means including digital color modulator means for translating said pre-filtered chrominance signal to the conventional NTSC chrominance band, and means including second adding means for adding the chrominance signal processed by said digital color modulator means to the luminance signal produced at the output of said first adding means and producing an NTSC color television signal.

12. System as defined by claim 11, wherein said first and third combining means each combines said three adjacent television lines, designated Top (T), Middle (M) and Bottom (B), respectively, with the combination formula, $M + \frac{1}{2}(T+B)$, and said second combining means combines said three adjacent television lines with the combination formula $M - \frac{1}{2}(T+B)$.

* * * * *